(12) United States Patent
Lo

(10) Patent No.: US 9,439,365 B2
(45) Date of Patent: Sep. 13, 2016

(54) SUPPORTER FOR CONNECTING AND POSITIONING IRRIGATION DEVICE

(71) Applicant: YUAN-MEI CORP., Changhua County (TW)

(72) Inventor: Shun-Nan Lo, Changhua County (TW)

(73) Assignee: YUAN-MEI CORP., Changhua County (TW)

( * ) Notice: Subject to any disclaimer, the term of this patent is extended or adjusted under 35 U.S.C. 154(b) by 170 days.

(21) Appl. No.: 14/195,979

(22) Filed: Mar. 4, 2014

(65) Prior Publication Data
US 2015/0250110 A1     Sep. 10, 2015

(51) Int. Cl.
| | |
|---|---|
| *A62C 31/22* | (2006.01) |
| *A01G 25/02* | (2006.01) |
| *F16L 35/00* | (2006.01) |
| *F16L 41/02* | (2006.01) |
| *F16L 3/127* | (2006.01) |
| *F16L 29/00* | (2006.01) |

(52) U.S. Cl.
CPC .............. *A01G 25/02* (2013.01); *F16L 3/127* (2013.01); *F16L 29/002* (2013.01); *F16L 35/005* (2013.01); *F16L 41/021* (2013.01); *Y10T 137/9029* (2015.04)

(58) Field of Classification Search
USPC ........ 239/275–285, 581.1; 251/148; 137/798
See application file for complete search history.

(56) References Cited

U.S. PATENT DOCUMENTS

| | | | | |
|---|---|---|---|---|
| 3,385,525 | A * | 5/1968 | Jacobs ................. | B05B 1/1645 222/570 |
| 4,365,750 | A * | 12/1982 | Carlberg .................. | B05B 1/12 239/276 |
| 4,901,927 | A * | 2/1990 | Valdivia ................ | B05B 1/1636 137/883 |
| 4,995,423 | A * | 2/1991 | McHugh ................ | A62C 35/68 137/270 |
| 5,160,093 | A * | 11/1992 | Battaglia ............... | B05B 1/1609 239/276 |
| 8,297,661 | B2 * | 10/2012 | Proulx .................... | F16L 33/22 285/242 |
| 8,434,697 | B1 * | 5/2013 | Olt ....................... | A01C 23/042 239/310 |
| D745,118 | S * | 12/2015 | Kenney ....................... | D23/262 |
| 2008/0099712 | A1 * | 5/2008 | DeYoe ................. | F16K 5/0626 251/315.01 |
| 2008/0302882 | A1 * | 12/2008 | Rosselli ................ | A01G 25/00 239/1 |

* cited by examiner

*Primary Examiner* — Len Tran
*Assistant Examiner* — Adam J Rogers
(74) *Attorney, Agent, or Firm* — Raymond Y. Chan; David and Raymond Patent Firm

(57) ABSTRACT

A supporter for connecting and positioning irrigation devices is revealed. The supporter for connecting and positioning irrigation devices includes a conical body and a connecting device. The conical body consists of a sharp end and a connecting end. The sharp end is mounted into the ground for positioning. The connecting device is composed of a receiving portion, assembly portions, and a switch portion. The assembly portions are used for connection to hoses and water flow guidance while the switch portion is used to control on/off of the water flow in the connecting device. The connecting device is set on the connecting end of the conical body so as to connect to hoses and position the hoses on the ground by the conical body.

18 Claims, 10 Drawing Sheets

SUPPORTER FOR CONNECTING AND POSITIONING IRRIGATION DEVICE

BACKGROUND OF THE INVENTION

1. Fields of the Invention

The present invention relates to a supporter for connecting and positioning irrigation devices, especially to a supporter for connecting irrigation hoses and positioning emitters or sprinklers on the ground. Used like wooden stake, the present invention can connect hoses along the pathway designed according to user's requirements. One end of the supporter is connected to a sprinkler head or an emitter. A main body of the supporter is a one-piece conical body that is formed by four ribs extended outward from a central axis of the conical body. The main body is arranged with a connecting device for being connected to sprinklers or emitters. The supporter used for positioning can also be used to connect hoses.

2. Descriptions of Related Art

A conventional connecting device used in gardens is a positioning supporting rod that connects a plurality of hoses and positions the hoses on the ground. One end of the supporting rod is disposed with a sprinkler head or an emitter so as to connect to a water source and position a designed pathway for spray. The positioning supporting rod can be inserted into or removed from the ground.

Generally the connecting devices are used to set up water channels of irrigation system. The water channels are formed by hoses connected by positioning supporting rods. Then the positioning supporting rods are mounted into the ground for fixing the position of the hoses according to required pathway of irrigation. No matter the irrigation system is in large or small scale, a plurality of hoses is used to connect main/branch pipes to a water source.

The on/off of water flow in the irrigation system mentioned above is controlled at the water source. In such system, the amount of water supplied for irrigation may require modification due to various factors such as rugged ground or daylight. For example, there may be too much water accumulated on the low-lying ground while the amount of water applied on the higher ground is insufficient due to leakage. However, such positioning device for irrigation doesn't provide the function of turning on/off the water flow independently. Thus the water sprayed is unable to be adjusted according to plants' need. Although the positioning supporting rod can be removed and adjusted to change the water channel path, only the irrigation pathway is changed. The function of turning on/off the water flow is unable to be executed at each positioning supporting rod.

SUMMARY OF THE INVENTION

Therefore it is a primary object of the present invention to provide a supporter for connecting and positioning irrigation devices that is able to be mounted on the ground for connecting hoses at different area and guiding the hoses to irrigate at specific positions. The supporter can also be disposed with a switch used to control on/off of water flow in a single area.

It is another object of the present invention to provide a supporter for connecting or positioning irrigation devices that can be used independently besides for connecting water channels of irrigation system In order to achieve the above objects, a supporter for connecting and positioning irrigation devices of the present invention includes a conical body and a connecting device.

The conical body is composed of a sharp end and a connecting end. The sharp end is inserted into the ground for positioning. The connecting device consists of a receiving portion, assembly portions, and a switch portion. The assembly portions are used to connect to hoses, a sprinkler head or an emitter connector. Water flow is guided by the hoses connected and the position for water spray can be set due to the sprinkler assembled.

The switch portion is set on the receiving portion for control water flow flowing into/out of the receiving portion. The assembly portions include a first assembly portion, the second assembly portion, and the third assembly portion. The receiving portion is used for guiding water inflow and outflow and is extended to connect to the first assembly portion, the second assembly portion, and the third assembly portion so as to form a first water channel, a second water channel, and a third water channel respectively.

A valve part and a plate part are connected to form the switch portion and the switch portion is mounted in the receiving portion. As to the receiving portion, it is a branched hollow tube. The valve part is disposed on intersection of the branched tube while the plate part is arranged at the outer surface of the receiving portion and pivoted in the receiving portion to be assembled with the valve part, forming the switch portion.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein:

FIG. 1-1 is a cross sectional view of a conical body of the embodiment in FIG. 1 according to the present invention;

DETAILED DESCRIPTION OF THE PREFERRED EMBODIMENT

Figure 1:
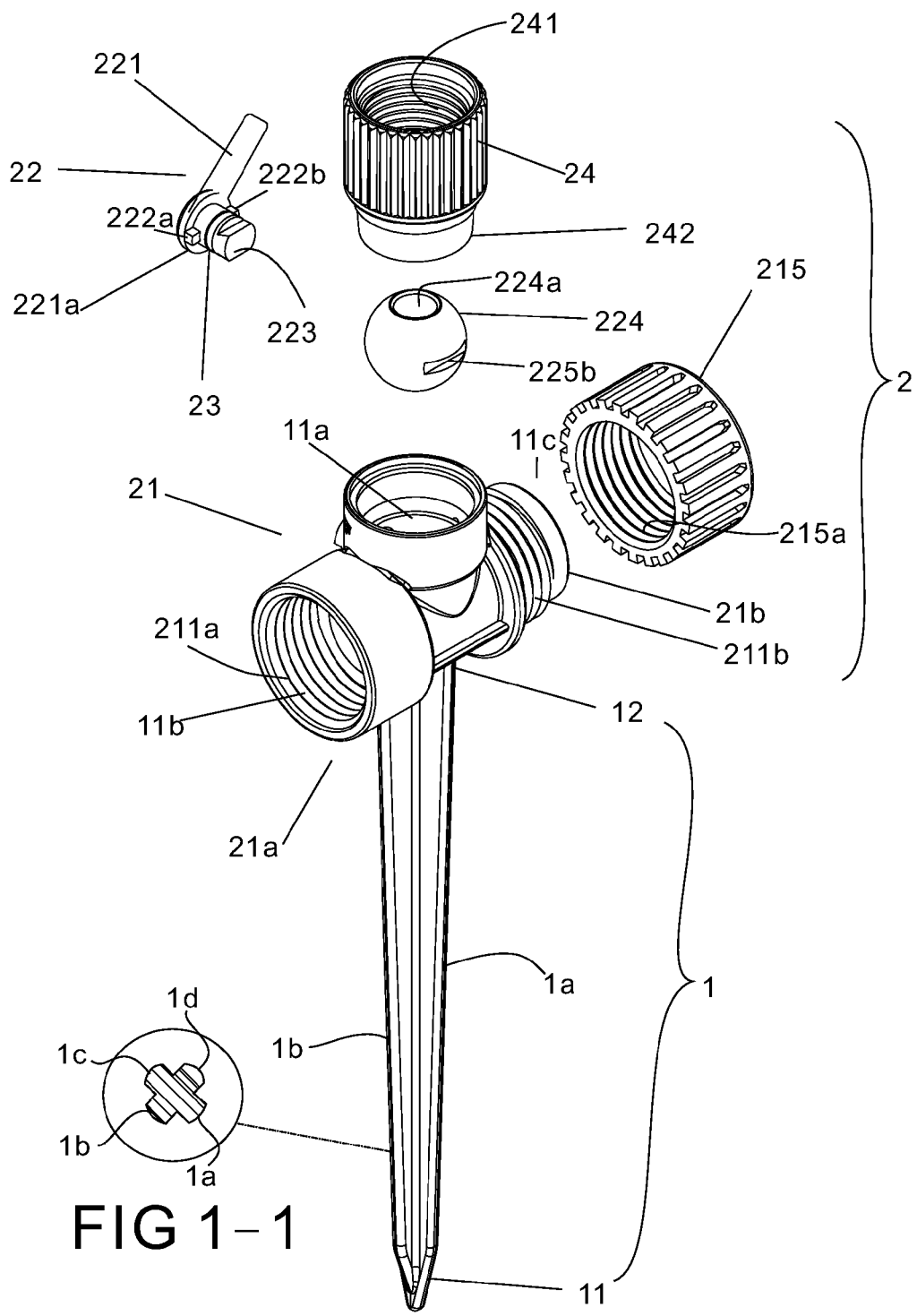
FIG. 1 is an explosive view of an embodiment according to the present invention.
Figure 2:
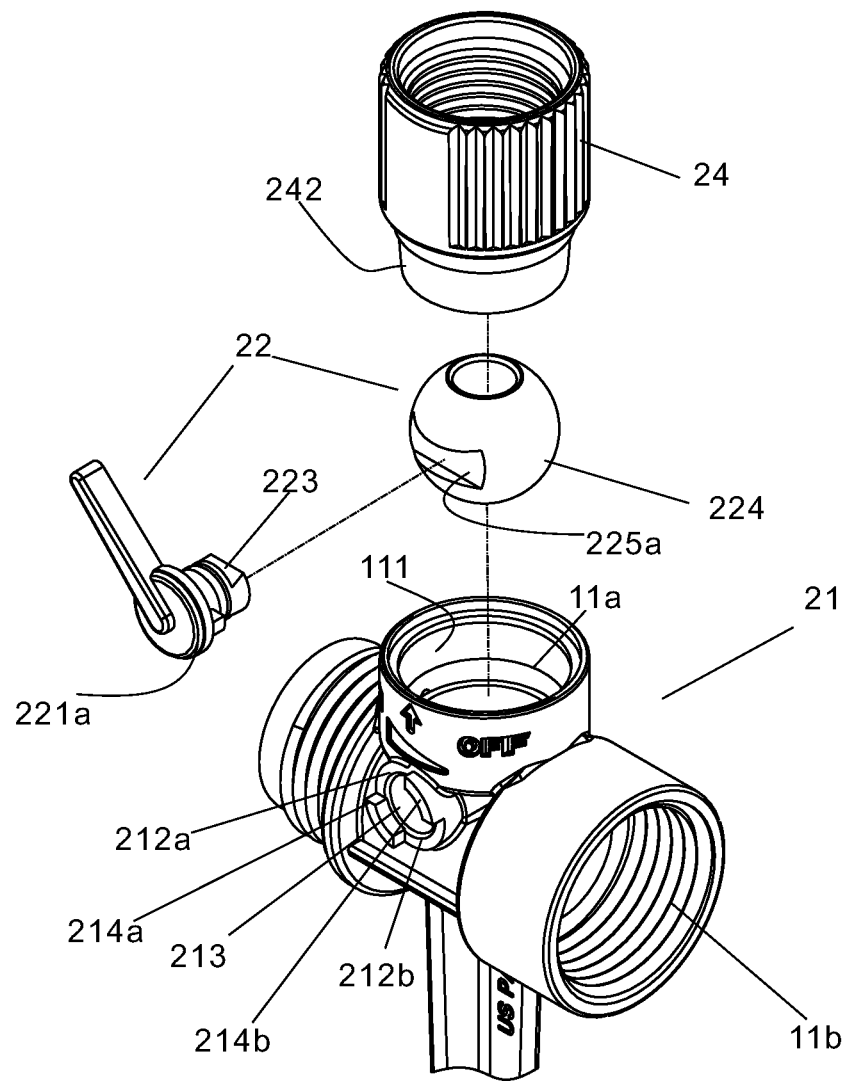
FIG. 2 is an explosive view of a connecting device of the embodiment in FIG. 1 according to the present invention.

Refer from FIG. 1 to FIG. 5, a supporter for connecting and positioning irrigation devices of the present invention includes a conical body 1 and a connecting device 2. The conical body 1 consists of a sharp end 11 and a connecting end 12. The sharp end 11 is formed by four ribs 1a, 1b, 1c, and 1d extended outward and arranged at a certain interval.

The cross section of the ribs 1a, 1b, 1c, 1d is tapered from the connecting end 12 to the sharp end 11 so that the conical body 1 has plastic rigidity.

The connecting device 2 is composed of a receiving portion 21, a first assembly portion 21a, a second assembly portion 21b, a third assembly portion 24, and a switch portion 22. The first assembly portion 21a is disposed with internal threads 211a so as to connect to a hose connector while the second assembly portion 21b is arranged with external threads 211b for being connected to another hose connector. The second assembly portion 21b can be further engaged with a ring cap 215. One end of the ring cap 215 is closed and the ring cap 215 is set with inner threads 215a therein. The ring cap 215 is used to seal the second assembly portion 21b. For example, when a hose is connected to a rear end of an irrigation path, the second assembly portion 21b of the last supporter should be sealed. Thus the second assembly portion 21b is engaged with a round cap 215 for being sealed. The third assembly portion 24 is arranged with internal threads 241, a connecting portion 242 and a rear end 242a. The internal threads 241 are used for being connected to a sprinkler head or an emitter connector while the connecting portion 242 and the rear end 242a are disposed on a bottom end of the third assembly portion 24. The connecting portion 242 is tightly connected to a neck 111 of the receiving portion 21 by ultrasonic sound and the rear end 242a is enclosed by a seal ring 243. The receiving portion 21 is set on the connecting end 12 of the conical body 1. More precisely, a branched tubular receiving portion 21 is extended from the connecting end 12 and having a pivot hole 213 at one end surface thereof. A first projecting rib 214a and a second projecting rib 214b are formed around an edge of the pivot hole 213. The first projecting rib 214a and a second projecting rib 214b are arranged at a certain interval and in symmetrical positions so as to form a first stopping part 212a and a second stopping part 212b therebetween.

The receiving portion 21 used for guiding water inflow and outflow is extended and connected to the first assembly portion 21a, the second assembly portion 21b, and the third assembly portion 24 to form a first water channel 11a, a second water channel 11b, and a third water channel 11c respectively.

The switch portion 22 includes a valve part 224 and a plate part 221 used to operating the switch portion 22. The plate part 221 is composed of a projecting part 223, an enlarged part 221a, a first stopping part 222a and a second stopping part 222b. One end of the plate part 221 is extended to form the enlarged part 221a and the projecting part 223 is extended from an end surface of the enlarged part 221a. Two sides of the projecting part 223 are extended to form the first stopping part 222a and the second stopping part 222b respectively. The projecting part 223 is wedge-shaped, the width of the front end is larger than the width of the rear end. The valve part 224 is ball-shaped and having a close part 224b, a channel 224a, a first concave part 225a and a second concave part 225b. The channel 224a is disposed along the central axis of the valve 224. The first concave part 225a is larger than the second concave part 225b. The first concave part 225a and the second concave part 225b are arranged at two sides of the valve 224. The first concave part 225a is a slot whose opening on top thereof has a width smaller than a width of a bottom surface thereof and having a certain depth.

Figure 3:
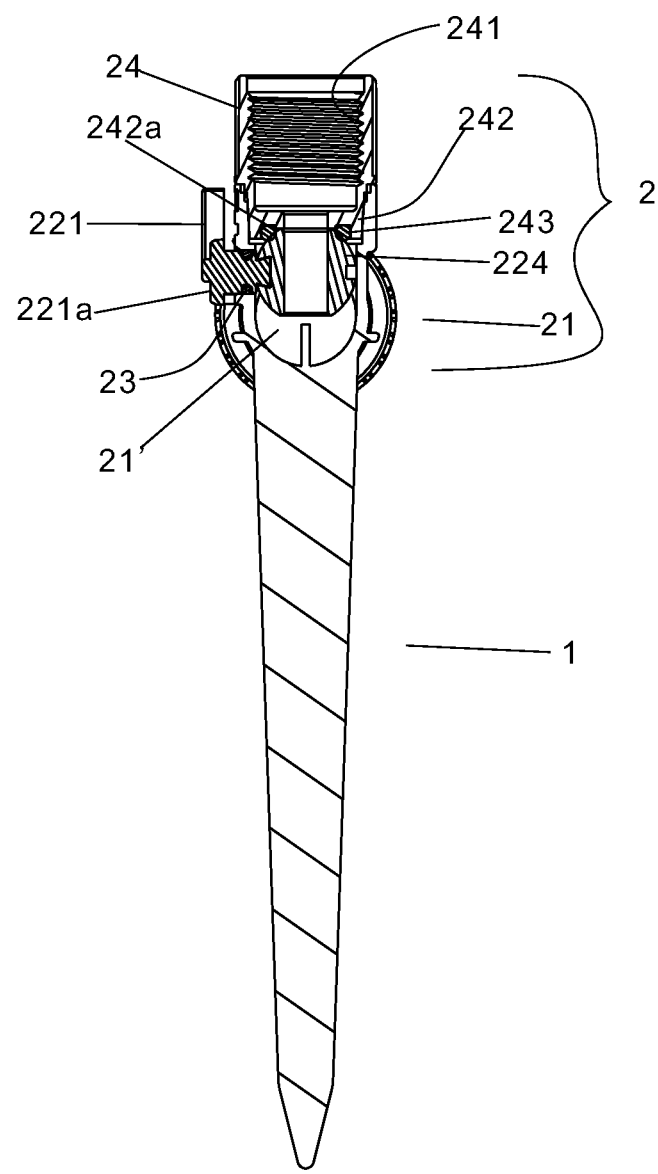
FIG. 3 is a cross sectional view of an assembled embodiment according to the present invention.
Figure 4:
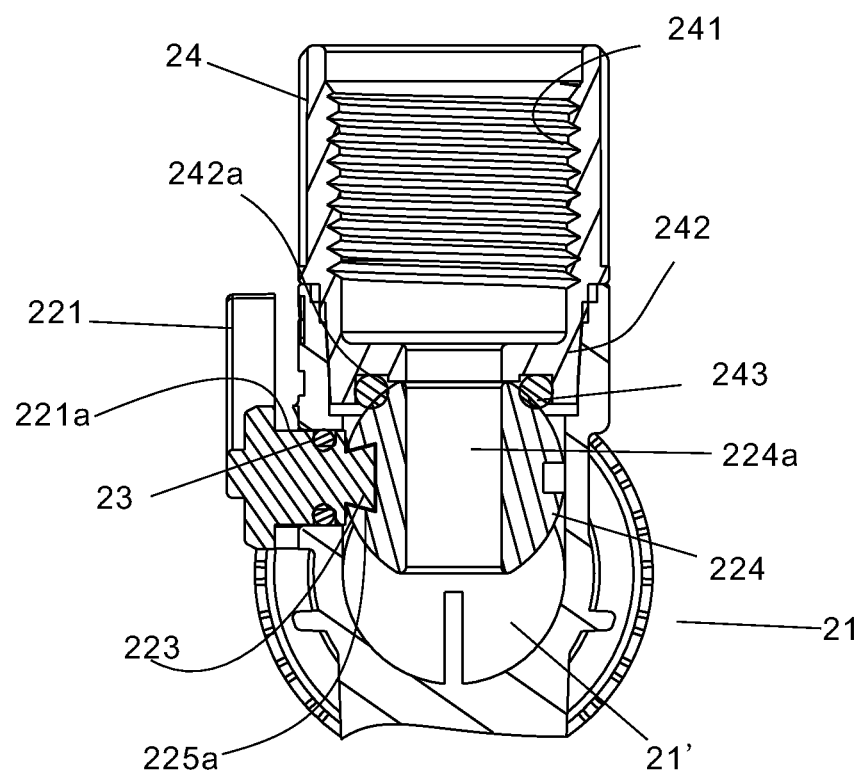
FIG. 4 is an enlarged cross sectional view of a connecting device of an embodiment according to the present invention.

The switch portion 22 is arranged at the receiving portion 21 while the receiving portion 21 is a branched hollow tube and having the first water channel 11a, the second water channel 11b, and the third water channel 11c. The valve part 224 is disposed on intersection of the first water channel 11a, the second water channel 11b, and the third water channel 11c. The plate part 221 is pivoted in the receiving portion 21 to be moveable on an outer surface of the receiving portion 21. The plate part 221 is assembled with the valve part 224 to form the switch portion 22. How the switch portion 22 is assembled with the receiving portion 21 is shown in FIG. 3 and FIG. 4. The valve part 224 of the switch portion 22 is mounted into a hollow space portion 21' of the receiving portion 21 and the first concave part 225a of the valve part 224 is facing the pivot hole 213. Then the projecting part 223 of the plate part 221 is passed through the pivot hole 213 to be mounted into the first concave part 225a of the valve part 224. At the same time, the first stopping part 222a and the second stopping part 222b are aligned and assembled with the stopping part 212a and the second stopping part 212b respectively. And the first projecting rib 214a and the second projecting rib 214b are worked as stopping walls used for stopping the first stopping part 222a and the second stopping part 222b. Thus the first stopping part 222a and the second stopping part 222b can be rotated within a certain range at the stopping part 212a and at the second stopping part 212b. As to the enlarged part 221a, it is enclosed by a seal ring 23 for sealing the pivot hole 213 and preventing water leakage. During rotation, the spherical surface of the valve part 224 is always leaning against the seal ring 243 on the rear end 242a of the connecting portion 242. In other words, there is always the seal ring 243 located between the valve part 224 and the rear end 242a of the connecting portion 242 when the valve part 224 is driven to rotate. The seal ring 243 maintains good surface finish and provides good resistance to water to the valve part 224. Thereby the assembly of the switch portion 22 has been completed and the switch portion 22 is used to control on/off of the water flow in the hollow space portion 21' of the receiving portion 21.

Figure 5:
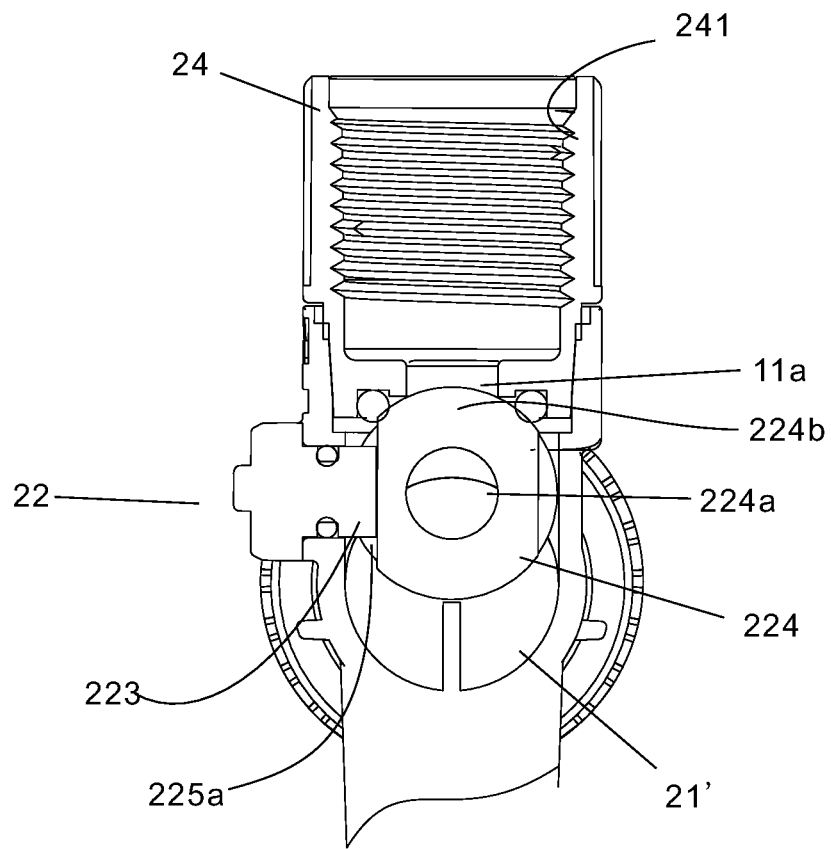
FIG. 5 is an enlarged cross sectional view of a connecting device of an embodiment viewed from the other side according to the present invention.
Figure 6:
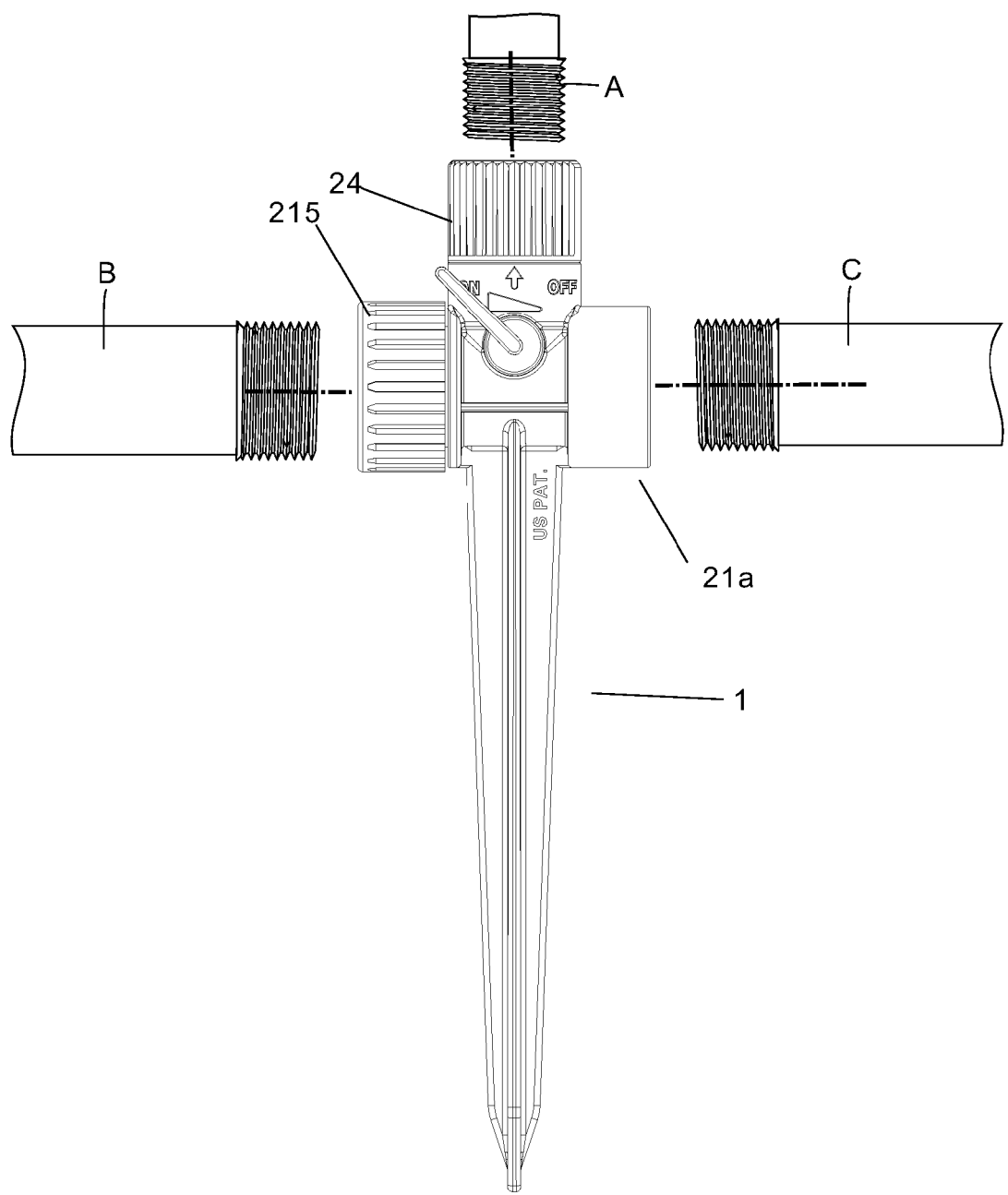
FIG. 6 is a schematic drawing showing an embodiment of the present invention in use.

Refer to FIG. 4, FIG. 5 and FIG. 6, when the plate part 221 of the switch portion 22 is pulled to the "ON" position, the water is allowed to flow. The channel 224a of the valve part 224 is axially aligned with the first water channel 11a and the hollow space portion 21'. Thus water in the hollow space portion 21' flows toward the first water channel 11a through the channel 224a and then flows out through the first water channel 11a. As shown in FIG. 5, the plate part 221 of the switch portion 22 is pulled to the "OFF" position and the water flow is stopped. The channel 224a of the valve part 224 is axially aligned with the second water channel 11b and the third water channel 11c. And the close part 224b of the valve part 224 is against the first water channel 11a to close the first water channel 11a. Thus water in the hollow space portion 21' is unable to flow toward the first water channel 11a.

Refer to FIG. 6, a schematic drawing showing how the present invention is connected to hoses and a sprinkle head. The receiving portion 21 is disposed on the connecting end 12 of the conical body 1and the first assembly portion 21a of the receiving portion 21 is connected to and engaged with a hose C while the second assembly portion 21b is threaded with another hose B and the third assembly portion 24 is connected to a sprinkler head or an emitter connector. By the conical body 1 mounted into the ground, the sprinkler is fixed firmly at a specific position.

Figure 7:
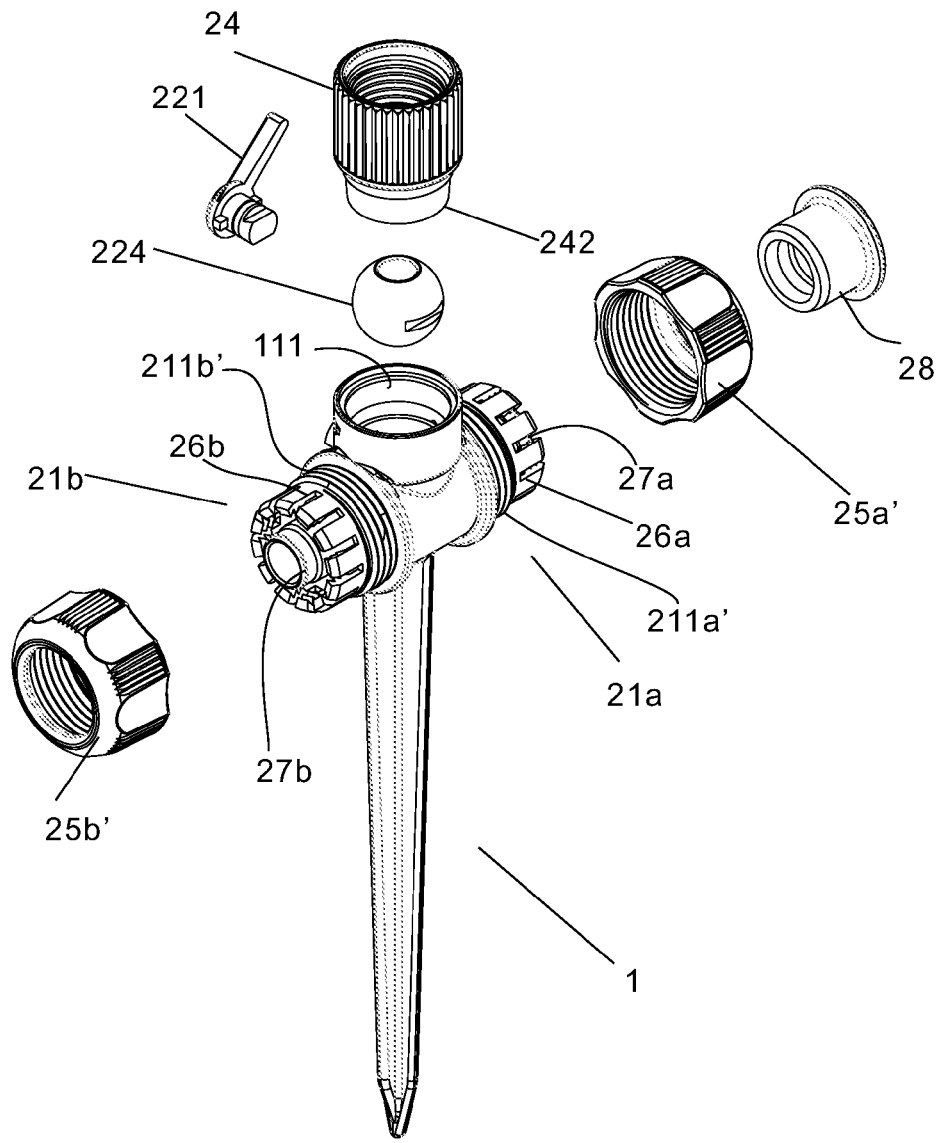
FIG. 7 is an explosive view of an embodiment according to the present invention.
Figure 8:
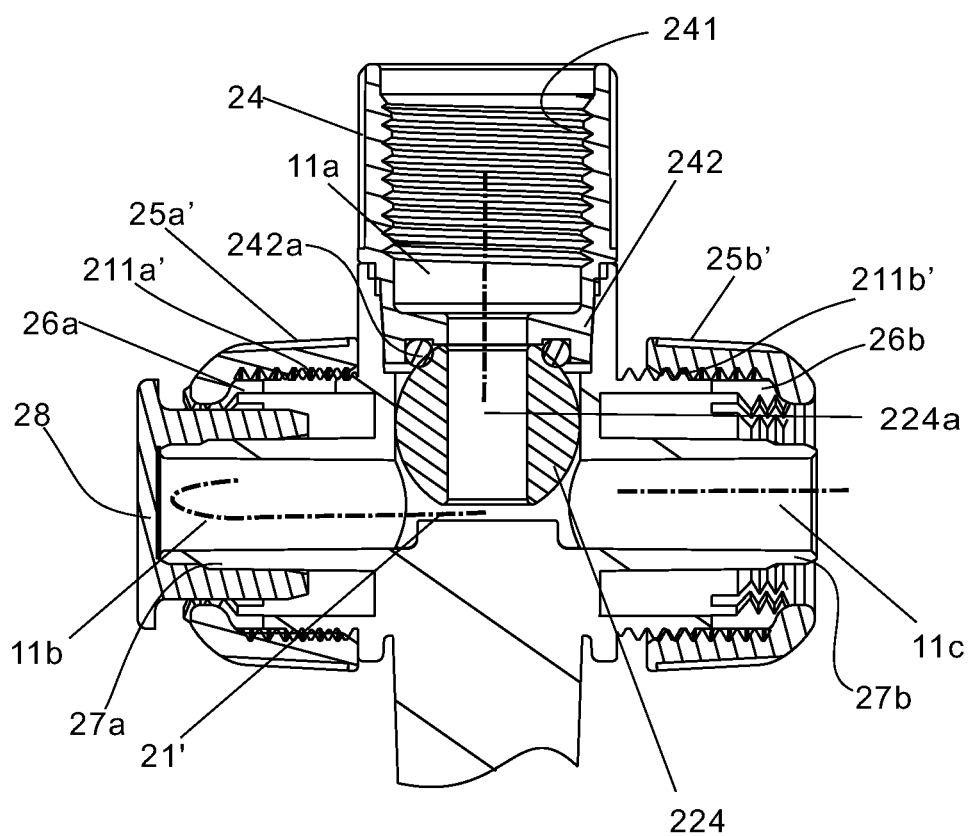
FIG. 8 is an enlarged cross sectional view of a connecting device of an embodiment according to the present invention.
Figure 9:
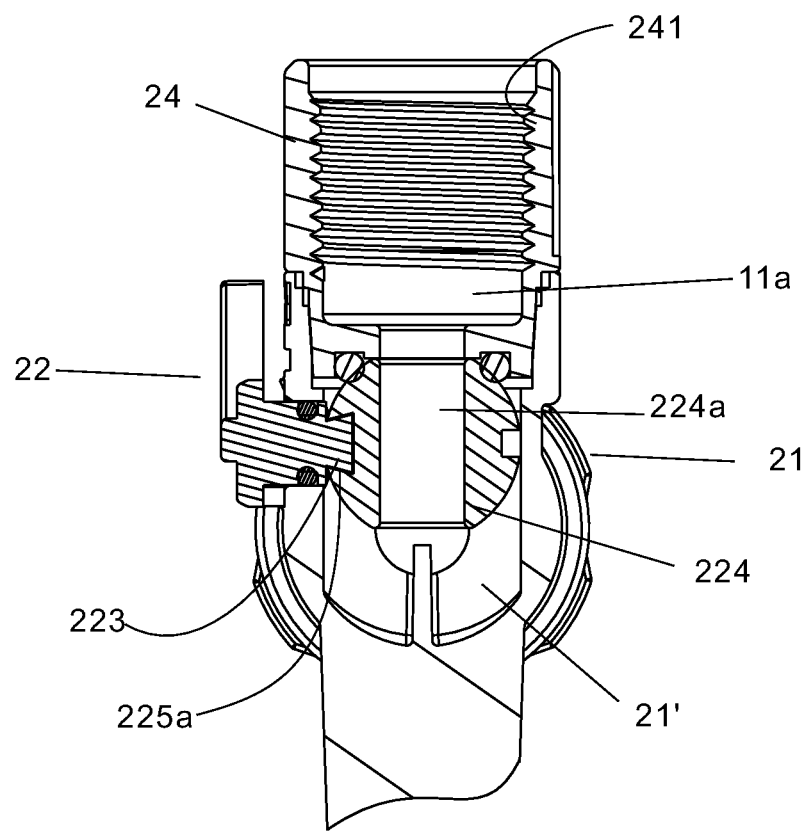
FIG. 9 is another enlarged cross sectional view of a connecting device of an embodiment according to the present invention.

Refer to FIG. 7 and FIG. 8, the difference between this embodiment and the above one is in the three assembly portions 21a, 21b, 24. The first assembly portion 21a is disposed with external threads 211a' for being engaged with a first ring 25a' while the second assembly portion 21b is arranged with external threads 211b' so as to be engaged with a second ring 25b'. Both the first ring 25a' and the second ring 25b' are mounted with internal threads for being threaded with the external threads 211a' of the first assembly portion 21a and the external threads 211b' of the second assembly portion 21b respectively.

An elastic claw part 26a and an elastic claw part 26b are extended from the external threads 211a' of the first assembly portion 21a and the external threads 211b' of the second assembly portion 21b respectively. The elastic claw part 26a/26b includes a plurality of elastic pieces extended from and arranged circularly around the external threads 211a'/211b' at a certain interval. Each elastic piece of the elastic claw part 26a/26b is conical.

A hollow space portion 21' of a the receiving portion 21 is extended axially to form and axial tubes 27a, 27b inside the first assembly portion 21a and the second assembly portion 21b. The third assembly part 24 is arranged with internal threads 241 for being connected to a sprinkler head or an emitter connector A. The first assembly portion 21a and the second assembly portion 21b are threaded with the first ring 25a' and the second ring 25b' respectively.

Figure 10:
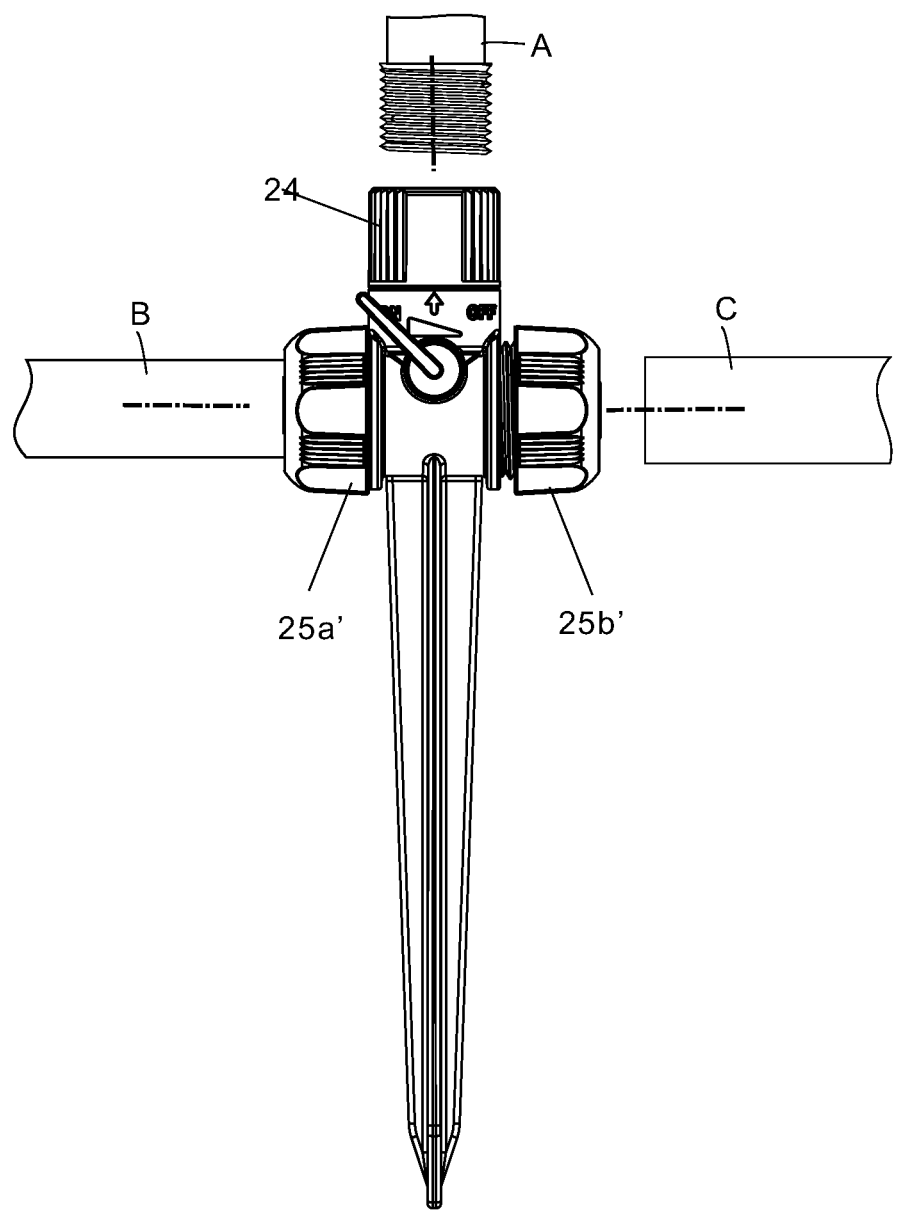
FIG. 10 is a schematic drawing showing an embodiment of the present invention in use.

As shown in FIG. 10, a hose B and a hose C are mounted into the outside diameter of the axial tubes 27a, 27b respectively while the hose B and the hose C are connected to the first assembly portion 21a and the second assembly portion 21b. That means the outside diameter of the axial tubes 27a, 27b is enclosed by the inside diameter at one end of the hose B and the hose C respectively. And the elastic claw parts 26a, 26b are around the outside diameter of the hose B and the hose C respectively. Then the first ring 25a' and the second ring 25b' are tightly engaged with the external threads 211a' 211b' respectively. Thus the elastic claw parts 26a, 26b are pressed by the first ring 25a' and the second ring 25b' to contract toward the axis and press the hose B and the hose C against the first assembly portion 21a and the second assembly portion 21b firmly, without falling off. When one end of the first assembly portion 21a or one end of the second assembly portion 21b is not connected to the hose, a seal cap 28 is covered on the first assembly portion 21a or the second assembly portion 21b so as to block outflow of the first assembly portion 21a or outflow of the second assembly portion 21b.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A supporter for connecting, supporting and positioning irrigation devices, and configuring a pathway of irrigation hoses, comprising:
   a conical body having a sharp end and a connecting end, wherein said sharp end of said conical body is adapted for mounting into a ground as a positioning means;
   a ring cap; and
   a connecting device arranged at and extended from the connecting end of the conical body and having a receiving portion for guiding water flow and a switch portion; the receiving portion including a hollow space portion and disposed with a first assembly portion, a second assembly portion, and a third assembly portion; the hollow space portion extended toward the first assembly portion, the second assembly portion, and the third assembly portion to form a first water channel, a second water channel, and a third water channel respectively for guiding the water to flow from the first water channel to the second water channel and to the third water channel, wherein the ring cap is detachably coupled at the second assembly portion to close the second water channel;
   each of the first assembly portion and the second assembly portion having a thread structure that each of the first assembly portion and the second assembly portion is arranged for connecting with a water hose to a water source or to a second connecting device of the supporter, wherein the third assembly portion is used for connection of a sprinkler or an emitter;
   the switch portion arranged at intersection of the first water channel, the second water channel, and the third water channel;
   the switch portion having a valve part and a plate part connected to each other and mounted in the receiving portion;
   the plate part disposed on an outer surface of the receiving portion and is pivoted in the receiving portion to be assembled with the valve part to form the switch portion, wherein the plate part is moved between a first position for allowing the water to flow from the first water channel to both of the second water channel and the third channel, and a second position for blocking the water to flow the first water channel to both of the second water channel and the third channel, wherein when the plate part is moved at the first position and the ring cap is coupled at the second assembly portion, the connecting device is arranged for guiding the water to flow from the first water channel to the third channel, wherein when the plate part is moved at the first position and the ring cap is detached from the second assembly portion, the connecting device is arranged for guiding the water to flow from the first water channel to the second channel and the third channel for configuring the pathway of irrigation hoses.

2. The device as claimed in claim 1, wherein the one end surface of the receiving portion is disposed with a pivot hole; a first projecting rib and a second projecting rib are arranged symmetrically with an interval around an edge of the pivot hole so as to form a first stopping part and a second stopping part therebetween; the plate part includes a projecting part, an enlarged part, a first stopping part and a second stopping part; the projecting part of the plate part is passed through the pivot hole to be mounted into the first concave part of the valve part; the first stopping part and the second stopping part are aligned and assembled with the stopping part and the second stopping part respectively; the first projecting rib and the second projecting rib are worked as stopping walls used for stopping the first stopping part and the second stopping part so that the first stopping part and the second stopping part are able to be rotated within a certain range at the stopping part and at the second stopping part; the enlarged part is enclosed by a seal ring for sealing the pivot hole; thereby assembly of the switch portion used to control on/off of water flow from the hollow space portion to the first water channel is completed.

3. The device as claimed in claim 1, wherein the valve part is ball-shaped and having a close part, a channel, a first concave part and a second concave part, wherein when the plate part is moved at the first position, the channel of the valve part is axially aligned with the first water channel and the hollow space portion, and when the plate part is moved at the second position, the channel of the valve part is axially aligned with the second water channel and the third water channel.

4. The device as claimed in claim 2, wherein the pivot hole is facing the first concave part of the valve part.

5. The device as claimed in claim 1, wherein the first assembly portion is disposed with external threads for being engaged with a first ring and the second assembly portion is arranged with external threads so as to be engaged with a second ring; the first ring and the second ring are both arranged with internal threads for being engaged with the external threads of the first assembly portion and the external threads of the second assembly portion respectively.

6. The device as claimed in claim 5, wherein two elastic claw parts are extended from the external threads of the first assembly portion and the external threads of the second assembly portion respectively.

7. The device as claimed in claim 6, wherein the elastic claw parts are formed by a plurality of elastic pieces arranged circularly around the external threads and the external threads at a certain interval respectively.

8. The device as claimed in claim 7, wherein the elastic claw parts are conical elastic pieces arranged circularly.

9. The device as claimed in claim 1, wherein the sharp end is formed by four ribs extended outward and arranged at an equal interval; each of the four ribs is tapered from the connecting end to the sharp end.

10. An irrigation connecting, supporting, and positioning system for irrigating different areas, comprising:
a plurality of supporters defining a first supporter and a last supporter, wherein each of the supporters comprises:
a ring cap;
a connecting device extended from the conical body, wherein the connecting device has a first assembly portion, a second assembly portion, a third assembly portion, and a receiving portion defining a hollow space portion toward the first assembly portion, the second assembly portion, and the third assembly portion to form a first water channel, a second water channel, and a third water channel respectively, wherein each of the first assembly portion and the second assembly portion has a thread structure and the third assembly portion is used for connection of a sprinkler or an emitter, wherein the first assembly portion of the first supporter is arranged for connecting to a water source, wherein the second assembly portion of the first supporter is connected to the first assembly portion of the last supporter via a water hose, wherein the ring cap is detachably coupled at the second assembly portion of the last supporter to close the second water channel thereof, wherein the connecting device further has a switch portion arranged at an intersection of the first water channel, the second water channel, and the third water channel, wherein the switch portion comprises a valve part and a plate part connected to each other and mounted in the receiving portion, wherein the plate part is disposed on an outer surface of the receiving portion and is pivoted in the receiving portion to be assembled with the valve part to form the switch portion, wherein the plate part is moved between a first position for allowing the water to flow from the first water channel to both of the second water channel and the third channel, and a second position for blocking the water to flow the first water channel to both of the second water channel and the third channel, wherein when the plate part of the first supporter is moved at the first position, the connecting device of the first supporter is arranged for guiding the water to flow from the first water channel of the first supporter not only to the first water channel of the last supporter through the third channel of the first supporter but also to the third water channels of the first supporter and the last supporter for irrigating different areas, wherein when the plate part of the first supporter is moved at the first position and the plate part of the last supporter is moved at the second position, the connecting device of the first supporter is arranged for guiding the water to flow from the first water channel of the first supporter to the third water channel of the first supporter for irrigating a particular area; and
a conical body, which is extended from said connecting device, having a sharp end adapted for mounting into a ground, wherein said conical bodies of said supporters are arranged for mounting at different areas to be irrigated so as to configure a pathway of irrigation hoses.

11. The system, as recited in claim 10, wherein the one end surface of the receiving portion is disposed with a pivot hole; a first projecting rib and a second projecting rib are arranged symmetrically with an interval around an edge of the pivot hole so as to form a first stopping part and a second stopping part therebetween; the plate part includes a projecting part, an enlarged part, a first stopping part and a second stopping part; the projecting part of the plate part is passed through the pivot hole to be mounted into the first concave part of the valve part; the first stopping part and the second stopping part are aligned and assembled with the stopping part and the second stopping part respectively; the first projecting rib and the second projecting rib are worked as stopping walls used for stopping the first stopping part and the second stopping part so that the first stopping part and the second stopping part are able to be rotated within a certain range at the stopping part and at the second stopping part; the enlarged part is enclosed by a seal ring for sealing the pivot hole; thereby assembly of the switch portion used to control on/off of water flow from the hollow space portion to the first water channel is completed.

12. The system, as recited in claim 10, wherein the valve part is ball-shaped and having a close part, a channel, a first concave part and a second concave part, wherein when the plate part is moved at the first position, the channel of the valve part is axially aligned with the first water channel and the hollow space portion, and when the plate part is moved at the second position, the channel of the valve part is axially aligned with the second water channel and the third water channel.

13. The system, as recited in claim 11, wherein the pivot hole is facing the first concave part of the valve part.

14. The system, as recited in claim 10, wherein the first assembly portion is disposed with external threads for being engaged with a first ring and the second assembly portion is arranged with external threads so as to be engaged with a second ring; the first ring and the second ring are both arranged with internal threads for being engaged with the external threads of the first assembly portion and the external threads of the second assembly portion respectively.

15. The system, as recited in claim 14, wherein two elastic claw parts are extended from the external threads of the first assembly portion and the external threads of the second assembly portion respectively.

16. The system, as recited in claim 15, wherein the elastic claw parts are formed by a plurality of elastic pieces arranged circularly around the external threads and the external threads at a certain interval respectively.

17. The system, as recited in claim 16, wherein the elastic claw parts are conical elastic pieces arranged circularly.

18. The system, as recited in claim 10, wherein the sharp end is formed by four ribs extended outward and arranged at an equal interval; each of the four ribs is tapered from the connecting end to the sharp end.

* * * * *